United States Patent
Dec et al.

(10) Patent No.: US 9,491,234 B2
(45) Date of Patent: *Nov. 8, 2016

(54) DETERMINISTIC SESSION LOAD-BALANCING AND REDUNDANCY OF ACCESS SERVERS IN A COMPUTER NETWORK

(71) Applicant: Cisco Technology, Inc., San Jose, CA (US)

(72) Inventors: Wojciech Dec, Amsterdam (NL); William Mark Townsley, Paris (FR); Francois Le Faucheur, Valbonne (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/330,913

(22) Filed: Jul. 14, 2014

(65) Prior Publication Data

US 2014/0325039 A1 Oct. 30, 2014

Related U.S. Application Data (63) Continuation of application No. 12/323,805, filed on Nov. 26, 2008, now Pat. No. 8,782,256.

(51) Int. Cl.
*G06F 15/173* (2006.01)
*H04L 29/08* (2006.01)
*H04L 12/24* (2006.01)

(52) U.S. Cl.
CPC ....... *H04L 67/1002* (2013.01); *H04L 41/0806* (2013.01); *H04L 67/1027* (2013.01); *H04L 67/125* (2013.01)

(58) Field of Classification Search
CPC .......... H04L 41/0806; H04L 67/1002; H04L 67/125; H04L 67/1027
USPC ................ 709/220, 228, 203, 221, 222, 227
See application file for complete search history.

(56) References Cited

U.S. PATENT DOCUMENTS

| | | | |
|---|---|---|---|
| 5,621,728 A * | 4/1997 | Lightfoot | H04L 12/66 348/E7.06 |
| 6,122,723 A * | 9/2000 | Day | G06F 13/36 710/21 |

(Continued)

FOREIGN PATENT DOCUMENTS

| | | | | |
|---|---|---|---|---|
| CN | 1791053 A | 6/2006 | | |
| DE | WO 2006048317 A3 * | 7/2006 | ............. | H04L 63/08 |

(Continued)

OTHER PUBLICATIONS

WestNet Glossary definition of "network interface": http://glossary.westnetinc.com/term.php?termid=1518.

(Continued)

*Primary Examiner* — Kostas Katsikis
(74) *Attorney, Agent, or Firm* — Polsinelli PC (57) ABSTRACT

In one embodiment, for each port of an access node in an access-based computer network, one access server of a plurality of access servers is configured as a preferred access server for that port. Upon receiving a session initiation message at a particular port, the access node forwards the session initiation message to one or more of the access servers based on the configured preferred access server for the particular port.

18 Claims, 7 Drawing Sheets

(56) References Cited

U.S. PATENT DOCUMENTS

| | | | |
|---|---|---|---|
| 6,330,246 B1* | 12/2001 | Denning | G06F 13/4022 370/438 |
| 6,470,389 B1* | 10/2002 | Chung | H04L 29/06 709/227 |
| 6,604,142 B1* | 8/2003 | Bertrand | H04L 29/06027 370/230 |
| 6,801,533 B1 | 10/2004 | Barkley | |
| 7,117,195 B2 | 10/2006 | Chantrain et al. | |
| 7,161,936 B1 | 1/2007 | Barrass et al. | |
| 7,197,556 B1* | 3/2007 | Short et al. | 709/224 |
| 7,289,488 B2 | 10/2007 | Qu | |
| 7,325,058 B1 | 1/2008 | Sheth et al. | |
| 7,376,140 B1 | 5/2008 | Franco et al. | |
| 7,484,006 B2 | 1/2009 | Chang et al. | |
| 7,516,211 B1 | 4/2009 | Gourlay et al. | |
| 7,639,698 B1 | 12/2009 | Sylvain et al. | |
| 7,774,492 B2 | 8/2010 | Raphel et al. | |
| 7,831,712 B1* | 11/2010 | Masters | H04L 67/1027 709/219 |
| 7,835,370 B2 | 11/2010 | Sajassi | |
| 7,995,609 B2 | 8/2011 | Keller-Tuberg et al. | |
| 8,004,961 B1 | 8/2011 | Buchanan et al. | |
| 8,155,132 B2 | 4/2012 | Bouchat et al. | |
| 8,549,149 B2* | 10/2013 | Sundarrajan | H04L 69/163 370/395.4 |
| 9,088,619 B2* | 7/2015 | Voit | H04L 61/2015 |
| 2001/0037394 A1* | 11/2001 | Yoshimura et al. | 709/228 |
| 2002/0002688 A1* | 1/2002 | Gregg | G06F 21/10 726/3 |
| 2002/0078371 A1 | 6/2002 | Heilig et al. | |
| 2002/0109718 A1* | 8/2002 | Mansour | G06F 9/4445 715/744 |
| 2002/0111995 A1* | 8/2002 | Mansour | G06F 9/4445 709/203 |
| 2002/0129096 A1* | 9/2002 | Mansour | G06F 9/4443 709/203 |
| 2002/0176414 A1 | 11/2002 | Miki et al. | |
| 2003/0018788 A1 | 1/2003 | Zsohar | |
| 2003/0028654 A1* | 2/2003 | Abjanic | H04L 67/2814 709/229 |
| 2003/0046589 A1* | 3/2003 | Gregg | G06F 21/335 726/5 |
| 2003/0118004 A1* | 6/2003 | Pan | H04L 29/06027 370/352 |
| 2003/0210694 A1* | 11/2003 | Jayaraman | H04L 67/1008 370/392 |
| 2004/0085968 A1 | 5/2004 | Chen et al. | |
| 2004/0153497 A1 | 8/2004 | Van Dyke et al. | |
| 2005/0152371 A1 | 7/2005 | Qu | |
| 2005/0165885 A1* | 7/2005 | Wong | H04L 67/1027 709/201 |
| 2005/0180408 A1 | 8/2005 | Mangetsu | |
| 2005/0281256 A1* | 12/2005 | Taipale | H04L 29/12377 370/389 |
| 2006/0095501 A1* | 5/2006 | Mochida | H04L 29/06027 709/203 |
| 2006/0126649 A1* | 6/2006 | Akiyoshi | H04L 29/06 370/401 |
| 2006/0161643 A1 | 7/2006 | Senapati et al. | |
| 2006/0245435 A1 | 11/2006 | Sajassi | |
| 2006/0245439 A1 | 11/2006 | Sajassi | |
| 2006/0248226 A1 | 11/2006 | Ambrose | |
| 2007/0008957 A1 | 1/2007 | Huang | |
| 2007/0019572 A1 | 1/2007 | Yoshida et al. | |
| 2007/0058617 A1 | 3/2007 | Stiemerling et al. | |
| 2007/0076607 A1 | 4/2007 | Voit et al. | |
| 2007/0104227 A1 | 5/2007 | Rivera | |
| 2007/0110028 A1 | 5/2007 | Wu | |
| 2007/0121612 A1 | 5/2007 | Nadeau et al. | |
| 2007/0165622 A1 | 7/2007 | O'Rourke et al. | |
| 2007/0180325 A1 | 8/2007 | Bailey et al. | |
| 2007/0263538 A1 | 11/2007 | Hueck et al. | |
| 2007/0280283 A1* | 12/2007 | Sorrini et al. | 370/465 |
| 2008/0059721 A1 | 3/2008 | Turner et al. | |
| 2008/0062999 A1 | 3/2008 | Platnic | |
| 2008/0069136 A1* | 3/2008 | Keller-Tuberg et al. | 370/465 |
| 2008/0109559 A1 | 5/2008 | Chhabra et al. | |
| 2008/0109853 A1 | 5/2008 | Einarsson et al. | |
| 2008/0181233 A1 | 7/2008 | Washam et al. | |
| 2008/0222243 A1* | 9/2008 | Shaw | H04L 65/4069 709/203 |
| 2008/0280623 A1* | 11/2008 | Danne | H04W 28/08 455/453 |
| 2008/0282254 A1 | 11/2008 | Blander et al. | |
| 2009/0003276 A1 | 1/2009 | Mutikainen et al. | |
| 2009/0059937 A1* | 3/2009 | Kanada | H04L 41/5003 370/401 |
| 2009/0164642 A1 | 6/2009 | Foti | |
| 2009/0219831 A1* | 9/2009 | Shaker | H04L 29/12028 370/254 |
| 2010/0023603 A1 | 1/2010 | Archer et al. | |
| 2010/0023629 A1* | 1/2010 | Lennaerta | H04L 29/12367 709/228 |
| 2010/0131659 A1* | 5/2010 | Narayana | H04L 65/1083 709/228 |

FOREIGN PATENT DOCUMENTS

| | | | | |
|---|---|---|---|---|
| EP | 1389890 A2 * | 2/2004 | | |
| EP | 1981217 A1 | 10/2008 | | |
| SE | WO 2004012389 A1 * | 2/2004 | | H04L 63/08 |
| WO | WO 2006076493 A2 * | 7/2006 | | |
| WO | 2009007327 A1 | 1/2009 | | |

OTHER PUBLICATIONS

Wikipedia, the free encyclopedia definition of "network interface": http://en.wikipedia.org/wiki/Network_interface.

Wikipedia, the free encyclopedia definition of "port (computer networking)": http://en/wikipedia.org/wiki/Port_(computer_networking).

Schiebl, Wolfgang-Peter, PCT Notification of Transmittal of the International Search Report and the Written Opinion of the International Searching Authority, or the Declaration, International Application No. PCT/US2009/006168, International Filing Date: Nov. 18, 2009, Date of Document mailing: Nov. 10, 2010, 19 pages, European Patent Office, Rijswijk, Neterhlands.

Wadhwa, S. et al., "Protocol for Access Node Control Mechanism in Broadband Networks (draft-ietf-ancp-protocol.04.txt)," IETF, Network Working Group, Internet-Draft, Nov. 3, 2008, 60 pages.

Kastlova, A., "Invitation to Pay Additional Fees and, Where Applicable, Protest Fee," International Appl. No. PCT/US2009/006168, International Filing Date: Nov. 18, 2009, Patent Cooperation Treaty, International Searching Authority, Rijswick, Netherlands, Jul. 8, 2010, 8 pages.

Voigt, et al., "Laker 2 Control Mechanism for Broadband Multi-Service Architectures," DSL Forum, Working Text WT-147, Draft Version 1.6, Architecture and Transport Working Group, Jun. 13, 2007.

* cited by examiner

DETERMINISTIC SESSION LOAD-BALANCING AND REDUNDANCY OF ACCESS SERVERS IN A COMPUTER NETWORK

RELATED APPLICATIONS

This application is a continuation of U.S. patent application Ser. No. 12/323,805, titled "DETERMINISTIC SESSION LOAD-BALANCING AND REDUNDANCY OF ACCESS SERVERS IN A COMPUTER NETWORK," filed on Nov. 26, 2008, the content of which is incorporated by reference herein in its entirety.

TECHNICAL FIELD

The present disclosure relates generally to computer networks, and, more particularly, to access technologies featuring access devices (e.g., multiplexing access nodes and access servers), for example, digital subscriber lines (DSL).

BACKGROUND

In computer networks utilizing access technologies, e.g., DSL, a user/client is generally allowed to open multiple sessions/connections on port of access device. In particular, various networks use multiple/redundant access servers, such as Network Access Servers (NAS) or Broadband Remote Access Servers (BRAS), in order to provide a redundant pair of IP (Internet Protocol) termination points. A user is often connected to each of these multiple access servers via an access node, such as a DSL Access Multiplexer (DSLAM).

Currently, there is no deterministic way to predict which access server will be used for a particular session or port. Network operators (administrators), however, often wish to coordinate policies for subscribers (users) between the multiple access servers, such as for Quality of Service (QoS), call admission control (CAC), troubleshooting (e.g., which device is causing a problem), etc. Coordinating or otherwise administering these policies can prove difficult, though, since there is no way to deterministically predict or know where the sessions are being serviced. For instance, a user may establish a first session (e.g., a point-to-point protocol over Ethernet or "PPPoE" session from one device in a subscriber's home) on a first access server, while a second session from the same user (e.g., another PPPoE session from another device is the same subscriber home) may be established on a second access server. While redundant servers may provide load-balancing features in this manner, they do not allow for easily coordinating these split resources, such that any subscriber agreements/policies (e.g., only a single video on demand session allowed from a particular user) are generally difficult to enforce.

BRIEF DESCRIPTION OF THE DRAWINGS

Advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, for each port of an access node in an access-based computer network, one access server of a plurality of access servers is configured as a preferred access server for that port. Upon receiving a session initiation message at a particular port, the access node forwards the session initiation message to one or more of the access servers based on the configured preferred access server for the particular port. For instance, in various embodiments, the preferred access server may be configured on the access server or on the access node, and the message may be modified by the access node to include an indication (e.g., port ID or preferred access server indicator) or to be unicast to the preferred access server, only.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Figure 1:
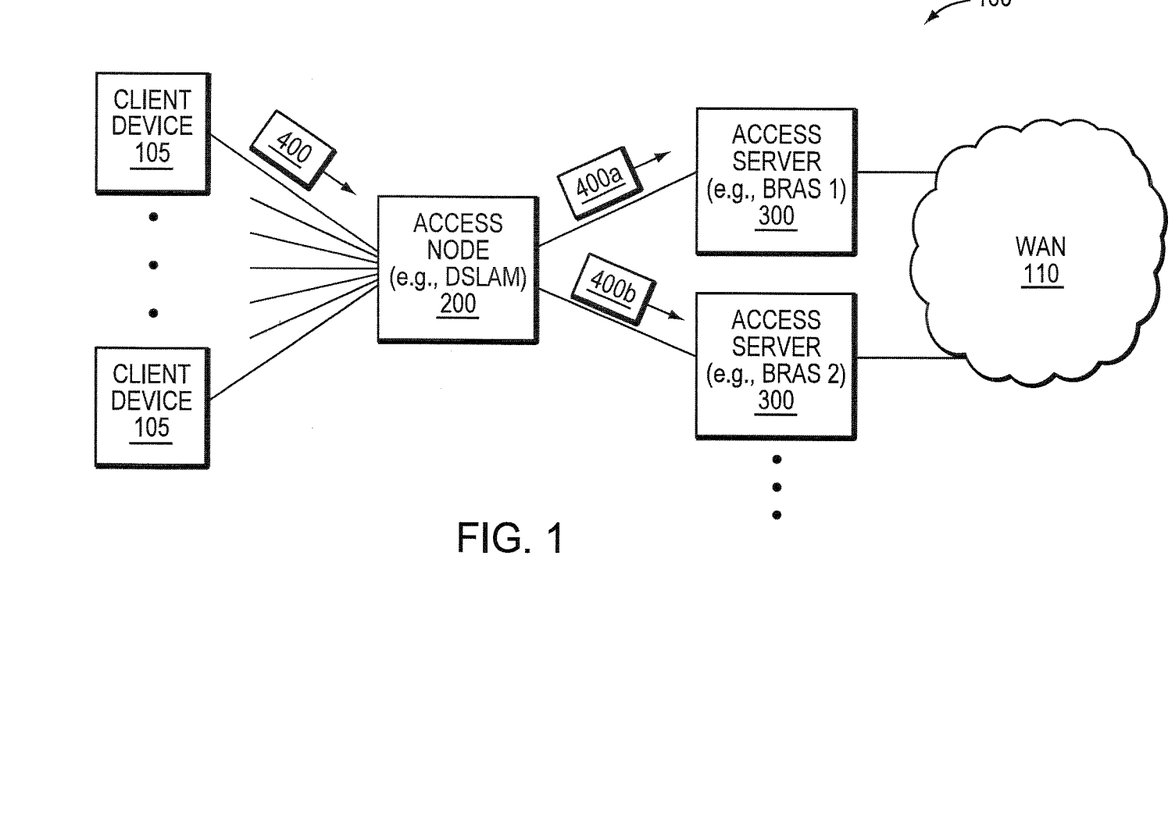
FIG. 1 illustrates an example computer network.

FIG. 1 is a schematic block diagram of an example computer network 100 illustratively comprising nodes/devices, such as one or more clients devices 105 interconnected with a WAN 110 (e.g., the Internet) via an access node and two or more access servers interconnected by links as shown. Illustratively, a portion of the network 100 is an access-based computer network, such as a digital subscriber line (DSL) network comprising clients 105, the access node (e.g., a DSL Access Multiplexer, or "DSLAM"), and the two or more access servers (e.g., Broadband Remote Access Servers, or "BRAS"), as may be appreciated by those skilled in the art. Note that while DSL is described, those skilled in the art will understand that network access devices may be any type of access or aggregation device that may be used in a similar manner (e.g., Ethernet switches, Network Access Servers or "NAS," etc.), and client devices 105 may be subscriber devices, e.g., home devices or customer premise equipment (CPE), such as a set-top-box, a cable modem, a personal computer (PC), etc. Further, those skilled in the art will understand that any number of nodes, devices, links, etc. may be used in the computer network, and that the view shown herein is for simplicity.

Data packets (e.g., messages 400) may be exchanged among the devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. For instance, the links connecting the subscriber/client devices 105 to the network access device (DSLAM) of a service provider network may utilize, e.g., DSL technology, Cable modems, etc., while the links within the provider network (e.g., DSLAM to BRAS) may be ATM, Ethernet, etc., as will be understood by those skilled in the art.

Note also that as used herein, "unicast" data transfer (i.e., unicast forwarding or "unicasting") involves forwarding a data packet from a single sending process of an end node ("source") to a single receiving process of an end node ("receiver") on the computer network. Also, where the destination of the data packet issued by a source may be more than one, but less than all of the receivers on the network, a "multicast" data transfer (i.e., multicast forwarding or "multicasting") may be used. Further, a "broadcast" data transfer (i.e., broadcast forwarding or "broadcasting") is where the destination of the data packet issued by a source is all of the receivers on the network (e.g., to a certain end point, such as a domain edge or a particular type of receiver, e.g., DSLAM to a plurality of BRAS, as described herein).

Figure 2:
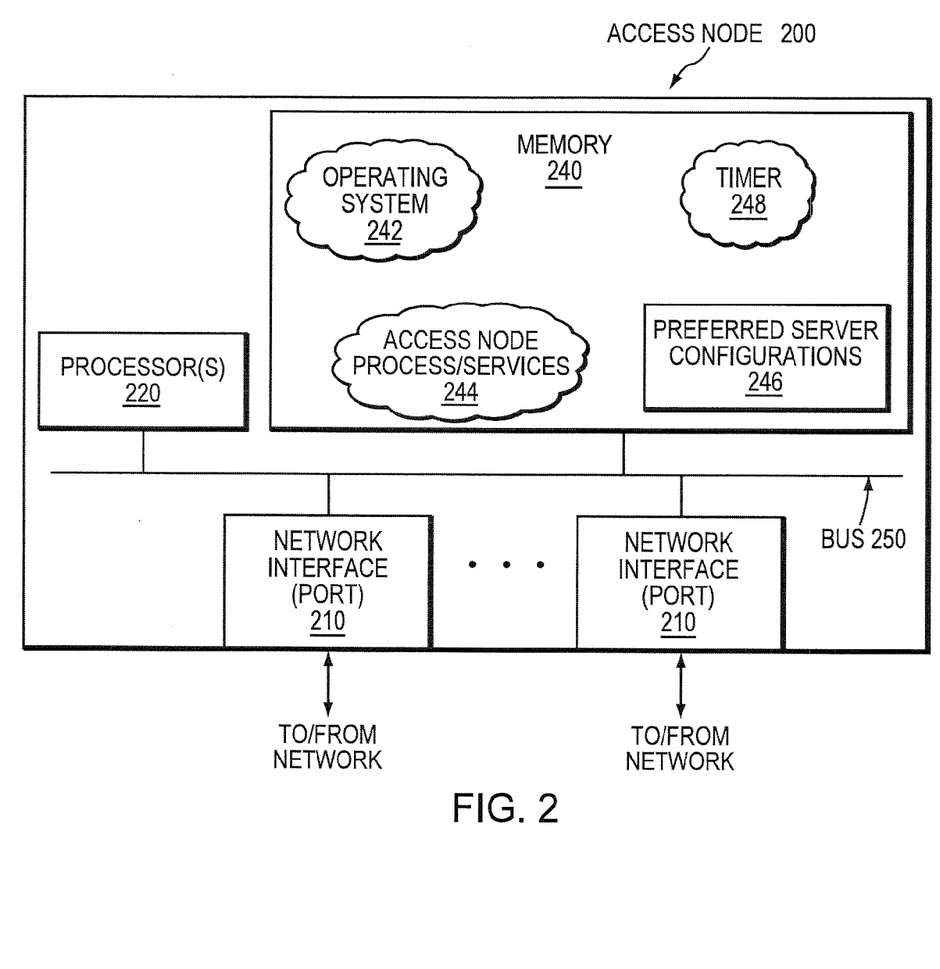
FIG. 2 illustrates an example access node.

FIG. 2 is a schematic block diagram of an example node/device 200 that may be advantageously used with one or more embodiments described herein, e.g., as an access node (e.g., DSLAM). The access node comprises a plurality of network interfaces (or "ports") 210, one or more processors 220, and a memory 240 interconnected by a system bus 250. The network interfaces/ports 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces/ports 210 for storing software programs and data structures associated with the embodiments described herein. The processor(s) 220 may comprise necessary elements or logic adapted to execute the software programs and manipulate the data structures, such as a configuration table 246 as described herein. An operating system 242 (e.g., the Internetworking Operating System, or IOS™, of Cisco Systems, Inc.), portions of which are typically resident in memory 240 and executed by the processor(s), functionally organizes the access node by, inter alia, invoking network operations in support of software processes and/or services executing on the device. These software processes and/or services may comprise "access node" process/services 244 and a timer process 248, each as described in further detail below. It will be apparent to those skilled in the art that other types of processors and memory, including various computer-readable media, may be used to store and execute program instructions pertaining to the inventive technique described herein.

Figure 3:
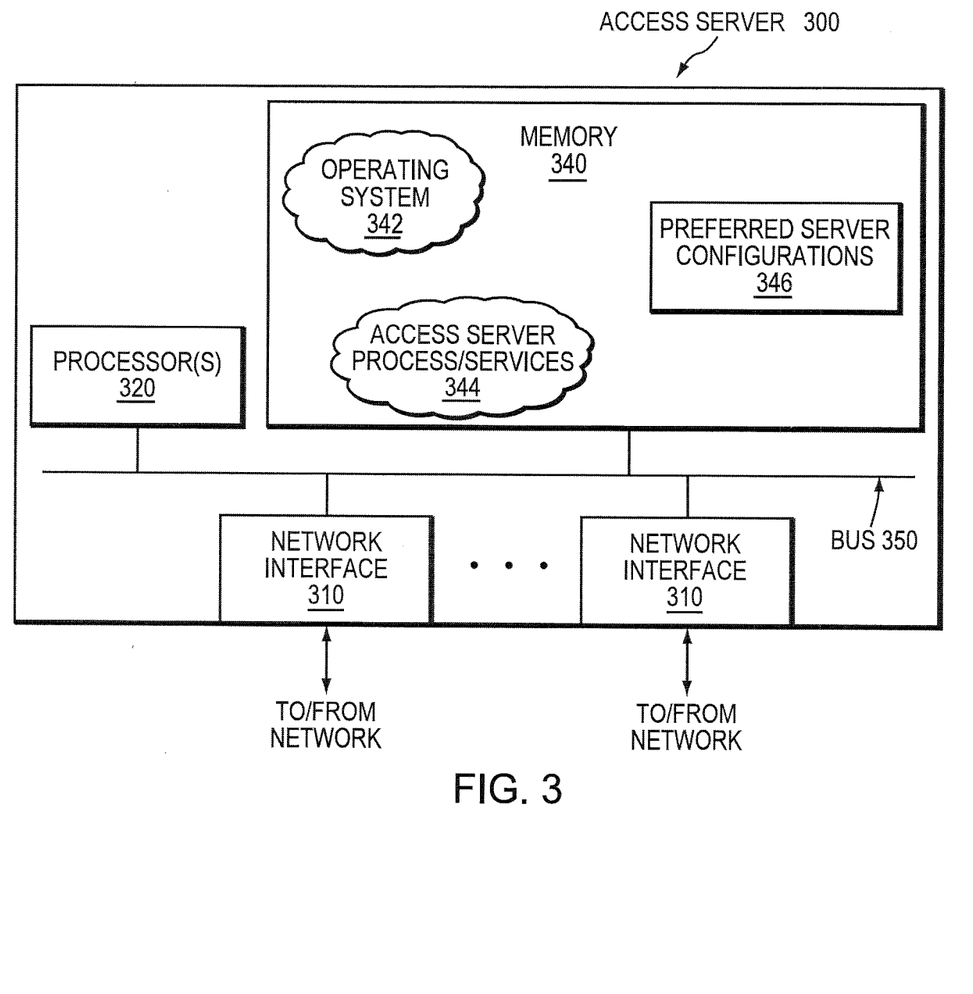
FIG. 3 illustrates an example access server.

Also, FIG. 3 is a schematic block diagram of an example node/device 300 that may be advantageously used with one or more embodiments described herein, e.g., as an access server (e.g., BRAS). The access server comprises a plurality of network interfaces (or "ports") 310, one or more processors 320, and a memory 340 interconnected by a system bus 350. The memory 340 comprises a plurality of storage locations that are addressable by the processor(s) 320 and the network interfaces/ports 310 for storing software programs and data structures associated with the embodiments described herein, such as a configuration table 346 as described herein. An operating system 342 (e.g., the Internetworking Operating System, or IOS™, of Cisco Systems, Inc.), portions of which are typically resident in memory 340 and executed by the processor(s), functionally organizes the access node by, inter alia, invoking network operations in support of software processes and/or services executing on the device. These software processes and/or services may comprise "access server" process/services 344 as described in further detail below.

In particular, as will be appreciated by those skilled in the art, the access node 200 (e.g., DSLAM) and access servers 300 (e.g., BRASes) may operate according to one or more access technologies, such as, e.g., DSL, Ethernet, etc. For instance, access node process/services 244 and access server process/services 344 may each contain computer executable instructions executed by respective processors 220/320 to perform functions related to corresponding access technologies. Illustratively, such processes may comprise conventional operation according to access nodes (e.g., DSLAMs) and access servers (e.g., BRASes) as will be understood by those skilled in the art, in addition to those features as described herein with reference to one or more embodiments of the disclosure.

Figure 4:
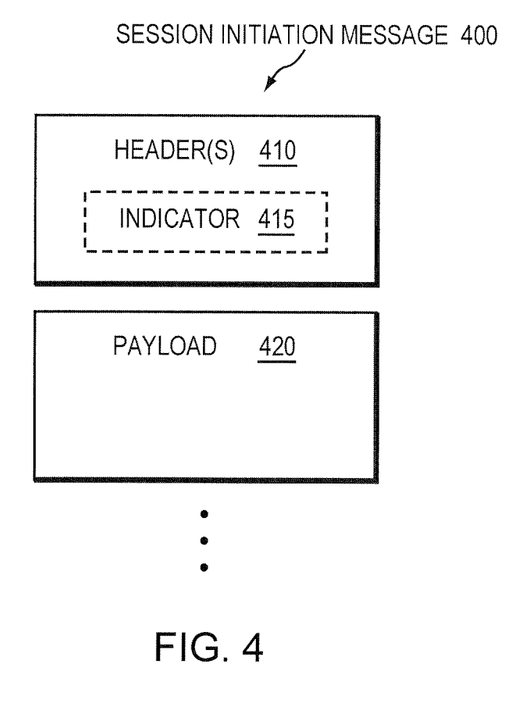
FIG. 4 illustrates an example session initiation message.

For example, a typical access technology session may be initiated by a client/subscriber request ("session initiation message") 400 being broadcast via an access node to all interconnected access servers. The access node transmits the messages 400a,b to the access servers, which respond to the client. Generally, the first server to respond to the client is selected for the session, and any subsequent data of that session is sent to that one server (or "controller"). Access node process 244 and access server process 344 may thus execute functions relating to this procedure, in addition to other functions as will be understand and as will be described further herein.

As noted above, network operators/administrators utilizing access technologies, such as PPPoE ("point-to-point protocol over Ethernet") or IPoE (IP over Ethernet) based subscriber sessions, together with multiple access servers (e.g., BRASes) on a common broadcast segment (shared segment) currently are unable to deterministically predict the access server which a given port of an access node (e.g., DSLAM) will use for a session. Typically, for instance, two access servers may be located on a shared segment, e.g., a VLAN, that is used to connect one or more access nodes, with each access node having multiple subscriber ports feeding traffic into that VLAN. According to conventional access protocols (e.g., PPPoE or IPoE), a user (e.g., client device 105) sends a session initiation message (e.g., a PPPoE "PADI" or IPoE "DHCP" message, as will be understood), which makes its way to the shared VLAN and is received by both access servers (e.g., BRAS1 and BRAS2). Each access server responds with a session reply message (e.g., a "PADO" message or DHCP reply message), and the current client protocol implementation makes the client select the access server whose reply is the first to arrive as the access server with which the client will attempt to establish a session/connection (e.g., by sending a "PADR," etc., as will also be understood). In this scenario, an operator has practically no way to predict which access server will be the one handling the subscriber's sessions, and is thus non-deterministic. Another problem arising from this behavior is that a second session/connection launched by the same subscriber could end up being served by a different access server.

While this feature does offer a manner in which load-balancing (e.g., PPP load balancing) may be performed, it also introduces a problem of enforcing an access-line policy across the two sessions on two separate access servers. For example, such access-line policies may include, e.g., per access-line scheduling/shaping and per access line admission control, each of which are very common operator requirements for a particular network. Similarly, it also introduces a problem of enforcing an access-node-level policy across sessions which are managed by separate devices, such as per access node uplink call admission control (CAC), scheduling, shaping, troubleshooting, etc., as mentioned above.

Deterministic Session Load-Balancing and Redundancy

According to embodiments of the disclosure, for each port of an access node (e.g., DSLAM) in an access-based computer network, one access server (e.g., BRAS) of a plurality of access servers is configured as a preferred access server for that port. Upon receiving a session initiation message 400 at a particular port, the access node forwards the session initiation message to one or more of the access servers based on the configured preferred access server for the particular port. For instance, in various embodiments, the preferred access server may be configured on the access server or on the access node, and the message may be modified by the access node to include an indication (e.g., port ID or preferred access server indicator) or to be unicast to the preferred access server, only.

Illustratively, the techniques described herein may be performed by hardware, software, and/or firmware, such as in accordance with a general "access node" or "access server" processes/services 244/344, depending upon which device is performing the particular action. These processes and/or services may be configured to operate in accordance with certain protocols, and in accordance with the techniques described herein. For instance, these processes may be configured to perform any one (or more) of three mechanisms targeted at specific problems identified within a corresponding network in which the access device is located. In particular, each mechanism solves the same problem in a slightly different way, but each, at its core, is directed to the same general technique mentioned above (and throughout). The first mechanism requires only control-plane level changes, utilizing modified/additional features of an access node control protocol operating between the access node and the access server (e.g., ANCP). The second requires additional information to be inserted by an access node (e.g., DSLAM) snooping control packets/frames (e.g., PPPoE or DHCP packets), and can operate in networks whether or not an access node control protocol (such as ANCP) is implemented. The third mechanism requires data-plane changes to the access node, but is transparent to the access servers (e.g., BRASes).

Operationally, ports 210 on an access node may be directly provisioned (configured) to prefer a given access server. For instance, any partition (e.g., physical or virtual) of ports may be grouped together to have a preferred access server for that partition (e.g., with granularity anywhere between a single port-basis to entire access node-basis). For example, illustrative ports 1-100 of an access node (DSLAM) may be configured to have BRAS1 as a preferred access server, while ports 101-200 of that access node may be configured to prefer BRAS2, etc. Alternatively, all ports on a given access node may all be provisioned to prefer a given access server, e.g., ports 1-200 of DSLAM1 (not shown) are configured to prefer BRAS1, ports 1-200 of DSLAM2 a configured to prefer BRAS2, etc. Notably, this information is generally configured by a provisioning system on the access node, and in certain embodiments may be transferred to the access servers.

According to a first embodiment, in particular, an access node control protocol (e.g., ANCP) allows an access server (e.g., BRAS) to be assigned as the controller of a particular port or VLAN on an access node. (An illustrative description of ANCP may be found in the Internet Draft entitled Protocol for Access Node Control Mechanism in Broadband Networks, dated Nov. 3, 2008, available from the Internet Engineering Task Force (IETF) as draft-ietf-ancp-protocol-04.txt.) For instance, the protocol currently allows for access servers to exchange information regarding an "active/backup server" controller setup, where each access server knows its respective status. Generally, all sessions are established with active servers only, and the backup or standby servers are used in the event of a failure. (Note that ANCP also has a quick failure detection of the ANCP adjacency, allowing a rapid switch to the backup controller in the event of an active server failure.) The problems faced above with regard to non-deterministic load-balancing and redundancy arises when multiple access servers (e.g., both BRAS1 and BRAS2) are in active mode ("active-active" setup).

In this first embodiment, the access node (e.g., DSLAM) is provisioned with ports (e.g., ranges) assigned to the interconnected access servers (e.g., BRAS1 and BRAS2). This information may be communicated via ANCP with extensions to the ANCP protocol, such that the access node "informs" the access servers of the preferred access server for each of its ports (thus, the access servers are configured to know the port identifications (IDs) to which they are or are not the preferred access server). Illustratively, this information may be stored (e.g., preconfigured before sessions are established) on the access node within configuration table 246, and on the access servers within configuration table 346.

When a client sends a session initiation message (e.g., for PPPoE or DHCP) to establish/originate a session, the message is "snooped" by the access node via current standard operation as will be understood by those skilled in the art. FIG. 4 illustrates an example session initiation message 400, such as, e.g., a PADI or DHCP DISCOVER message, shown simplified for purpose of discussion herein as may be appreciated by those skilled in the art. In particular, message 400 may comprise one or more headers 410 and a payload 420 to carry the information necessary for the requested session. Header information 410 generally comprises various message type fields, address fields, etc., and according to one or more embodiments herein, an "inserted indicator" field 415. (Notably, while field 415 is shown within headers 410, other suitable placements may be made within the scope of the embodiments herein, e.g., within payload 420.)

By snooping this message, an access node is able to monitor at least the header information to determine the type of message, its source and destination addresses, etc. In addition, however, the access node may also insert port (or "line") information into the message 400 (in field 415) that indicates the port ID of the port having received the message (i.e., the port on which the session would be established).

The access node then forwards the message 400 to the access servers, which receive the message having the inserted port information, i.e., the port ID. Based on this port ID, together with the information previously communicated via ANCP (the configured preferred access servers for each port), each access server can make a decision as to whether the message should be responded to or not. For instance, an access server may respond to the session initiation message if that access server is identified (or configured) as the preferred access server for the port ID in the session initiation message, or the access server may discard the message if it is not configured as the preferred access server.

As a variant, each access server can make a decision as to how fast/slow to respond to the message. For example, instead of strictly responding or not responding, the access servers may respond without delay or with delay, depending on their status as a preferred access server for the port ID, such that the preferred access server will (most likely) respond first, thus being selected by the client for the session, accordingly. Notably, delaying the response (as opposed to discarding the message) is not as deterministic as the response/no response mechanism above. However, given that most clients respond to the first response (e.g., PADO or DHCP OFFER) received, introducing a delay for the secondary access server will generally provide predictable behavior in most cases, and automatic failover in the event one access server fails (i.e., the delayed response will in effect become the first response received by the client if it is the only response). Also, prior to reconfiguration in the event of a failure, the user/client will timeout the session and send a new session initiation message 400, which again will result in the non-preferred access server being the first to respond (though delayed).

According to this embodiment, then, ANCP (or similar protocols) may be used to set up the control plane of the access servers, and then the data plane (access node's use of message 400) uses this setup to convey to the control plane which access node port the control plane traffic relates to, so that the access server can determine the preferred access server from the access node port. Also, ANCP provides an adjacency between the access node (e.g., DSLAM) and access server (e.g., BRAS) that is utilized to actively update the access servers with new port configurations, e.g., in general and/or in the event that one access server fails or otherwise becomes unavailable. This embodiment, therefore, expands the notion of "active/standby" access server status by configuring the "status" on the access node (e.g., DSLAM) on a per-port basis, and distributing this information to the access servers for use accordingly.

A second embodiment described herein does not need ANCP to be present between the access node and access servers, but changes the session protocols (e.g., PPPoE and DHCP) as well as the snooping function at the access node. According to this embodiment, the preferred access servers for each port are configured on the access node, but this configuration is not transferred to the access servers. Instead, the access servers are configured to read "hints" within the session initiation messages 400. In particular, similar to the mechanism described above, the access node snoops the session initiation messages, and inserts (into field 415) a preference marker/indication of the preferred access server for the port on which the message was received at the access node. This indication may be an access server ID/name, a preference number, etc. The access servers may then receive the updated message 400, and interpret the indication to determine whether it is the preferred access server for the session. For instance, to respond to the session initiation message based on the indication, an access server may decide to respond without delay if it is the indicated preferred access server, or with a delay if it is not the preferred access server. (Note that in the event there is no indication present, the access servers may operate in a conventional manner, thus allowing for backward compatibility.) Again, the delayed response is not completely deterministic, but does provide a predictable behavior under most circumstances, as well as desirable failover characteristics.

A third embodiment described herein does not need to change the session establishment protocols (e.g., DHCP or PPPoE), and is transparent to the access servers (e.g., BRAS). However, this embodiment has significant impact on the dataplane of the access node (e.g., DSLAM). Similar to the embodiments above, the preferred access servers for each port are configured on the access node. According to this embodiment, though, the access node intercepts a broadcast session initiation message 400 (e.g., PADI and DISCOVER messages), and forwards it to only the preferred access server based on the particular port on which the message 400 was received. In other words, the access node transforms the broadcast (or multicast) messages into unicast messages to the preferred access server (e.g., either via configured MAC address, previously discovered access node MAC address, configured IP address in the case of DHCP, or by sending the message over a separate VLAN dedicated to a given access server, etc.).

In this manner, the access servers (e.g., BRASes) receive session initiation messages 400 (PPPoE or DHCP messages) for ports only as dictated by the access node (e.g., DSLAM). Accordingly, there need not be any inserted indications (field 415) within the messages 400, since by only sending the message to a single preferred access server, the access server receiving the message is the preferred access server, and thus is the only access server that responds.

Notably, the access node may also employ failover techniques in the event that the preferred access server does not respond to the first unicast message passed. For instance, the access node may monitor for returned responses from the preferred access server, such that if an initiated timer (248) elapses prior to detecting a response, the access node may fall back to a broadcast of the message to all corresponding access servers such that any available access server may still respond in order to establish the session in a conventional manner.

Figure 5:
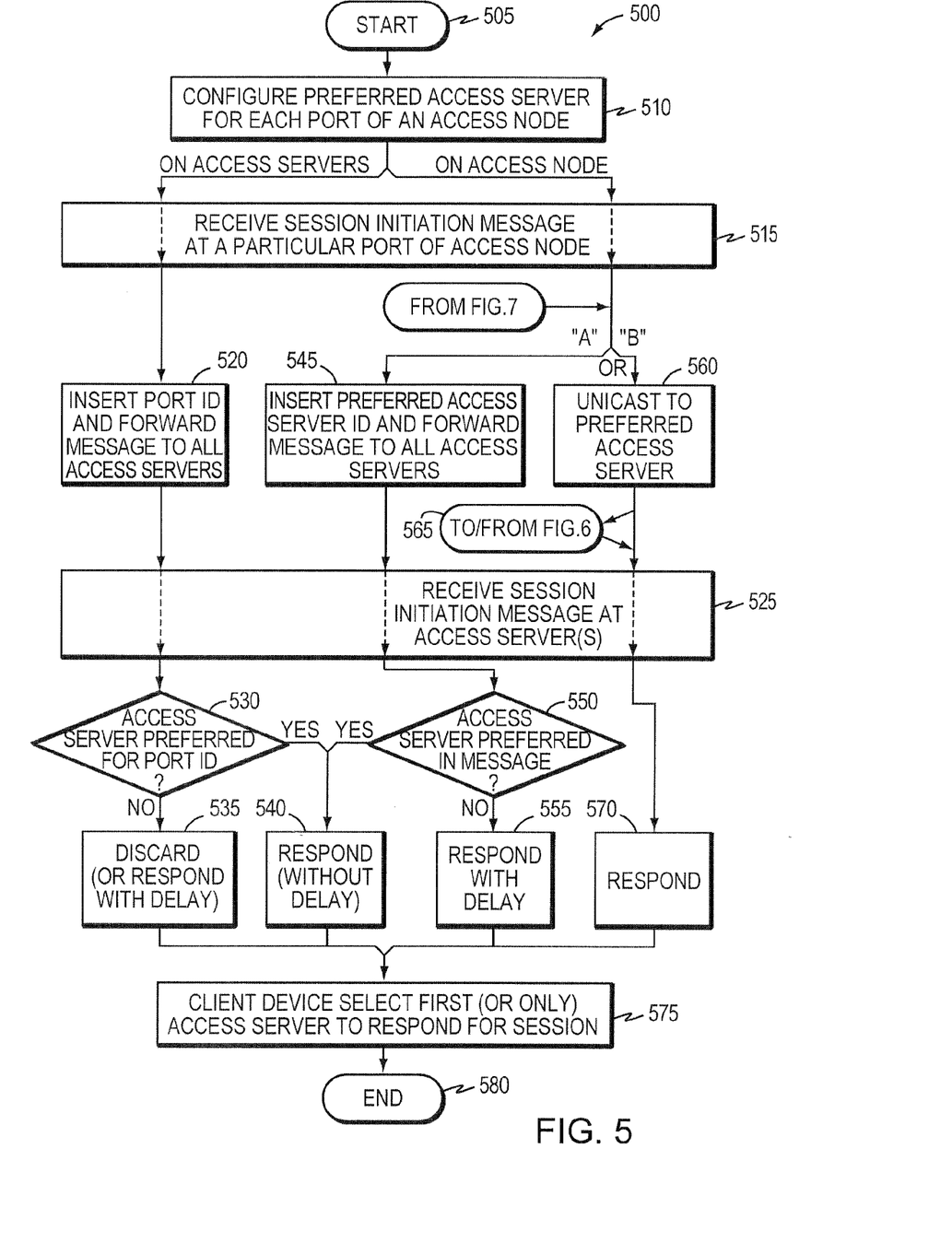
FIG. 5 illustrates an example procedure for deterministic session load balancing and redundancy.

Accordingly, the techniques/mechanisms of the three embodiments described above each solves the same problem in a slightly different way, but they are all directed to the same general principles of configuring preferred access servers per port of an access node, forwarding the session initiation messages based on that configuration (e.g., with inserted indicators, as a unicast message, etc.), and in certain instances, responding from an access server based on the configurations. FIG. 5 illustrates an example procedure for deterministic session load balancing and redundancy in accordance with each of the one or more embodiments described herein. The procedure 500 starts at step 505, and continues to step 510, where a preferred access server is configured for each port 210 of an associated access node (e.g., DSLAM). For instance, as described above, this configuration may take place on the access servers (e.g., BRAS1 and BRAS2) or on the access node.

In the event that the configuration is on the access servers (e.g., using ANCP, described above), in step 515 a particular port of the access node receives a session initiation message 400, e.g., from a client device 105. In this embodiment, the access node inserts a port ID into the message 400, and forwards the message to each access server in step 520, accordingly. Upon receiving the session initiation message 400 in step 525, each access server may determine whether it is the preferred access server for the port ID contained within the message in step 530. If not, in step 535 the access server may either discard the message, or may respond with a certain delay, as described above. If the access server is the preferred server, however, then in step 540 the server responds to the session initiation message (e.g., without delay) accordingly.

Conversely, in the event that the configuration of preferred access servers in step 515 is on the access node, in step 515 a particular port of the access node still receives a session initiation message 400, but now one of two options ("A" or "B") may be utilized. According to a first option ("A"), the access node inserts a preferred access server indication into the message 400, and forwards the message to each access server in step 545. Here, upon receiving the session initiation message 400 in step 525, each access server may determine whether it is the preferred access server based on the indication contained within the message in step 550. If it is not the preferred access server, in step 555 the access server may respond with a certain delay, while if the access server is the preferred server, however, then in step 540 the server may responds to the session initiation message (e.g., without delay).

Alternatively, a second option ("B") which may be performed by the access node replaces step 545 with step 560, where the access node unicasts the session initiation message 400 to only the preferred access server (e.g., transforming the multi/broadcast message into a unicast message). In this embodiment, as mentioned above, a subroutine/process may be performed in step 565, particularly with reference to FIG. 6.

Figure 6:
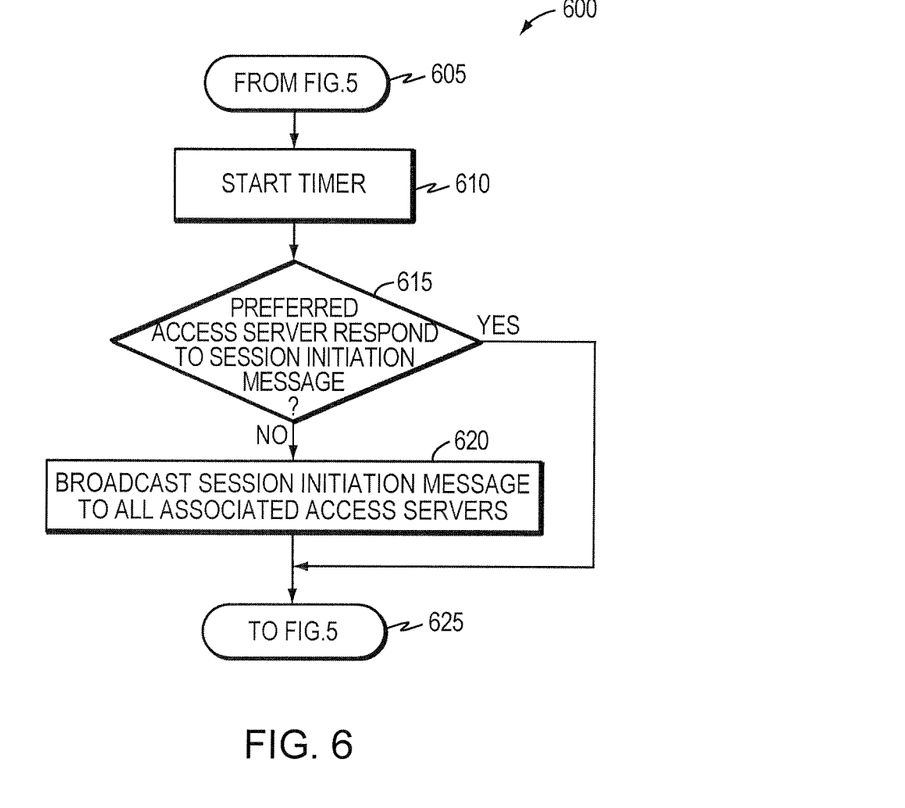
FIG. 6 illustrates an example procedure for ensuring preferred access server response in accordance with one or more embodiments.

Briefly, FIG. 6 illustrates an example procedure (sub-procedure) for ensuring preferred access server response in accordance with one or more embodiments described herein, e.g., where unicasting messages 400. The procedure 600 starts at step 605 from FIG. 5, and continues to step 610, where a timer is initiated in response to unicasting the message 400 to the preferred access server. If, as described above, in step 615 the preferred access server has not responded to the session initiation message after expiration of the timer, then in step 620 the access node may then multicast the session initiation message to all associated access servers, and the sub-procedure 600 returns to FIG. 5 in step 625. If the preferred access server has responded in step 615, then the access node need not perform further action, and the sub-procedure returns to FIG. 5 without multicasting the message.

Returning to FIG. 5 from step 560 (or 565), in step 525 an access server receives the session initiation message (or a plurality of access servers, as from FIG. 6 as necessary), and in step 570 the receiving access server(s) respond to the message accordingly (e.g., only the preferred having received the unicast message, or each remaining access server in a conventional manner to ensure that at least one access server is available to the client).

Regardless of the configuration path, once an access server responds in steps 535, 540, 555, and/or 570, then the client device may select the first (or only) access server to respond for the session, accordingly. In this manner, the preferred access server is generally the selected access server (that is, apart from failure or misconfiguration or otherwise), thus allowing deterministic session load-balancing and redundancy as desired. The procedure 500 ends in step 580.

Advantageously, the novel techniques described herein provide for deterministic session load-balancing and redundancy in an access-based computer network. By configuring a preferred access server for each port of a corresponding access node, the novel techniques allow for one access server to be the preferred controller for each particular port of an access node, whereas before, one port could end up anywhere at any time, and there was no way of knowing which port or server would be coupled for an assigned subscriber session. In particular, the techniques described above described three mechanisms that enable operators to specify at an access node which access server should be preferred for a given port (e.g., a port range). Each mechanism solves the problem with varying degrees of impact on the access node (e.g., DSLAM), access server (e.g., BRAS), and associated protocols. Also, the dynamic aspects of one or more embodiments described herein alleviate the need for cumbersome and inefficient manual configuration.

While there have been shown and described illustrative embodiments that provide for deterministic session load-balancing and redundancy in an access-based computer network, it is to be understood that various other adaptations and modifications may be made within the spirit and scope of the present invention. For example, the embodiments have been shown and described herein with reference to example networks relating to DSL access (e.g., DSLAMs, BRASes, etc.). However, the embodiments of the invention in their broader sense are not so limited, and may, in fact, be used with any access technology featuring access devices (e.g., DSL, Ethernet, wireless, etc.) and a shared medium with two or more subscriber termination nodes (access servers) interconnected with some form of multiplexing access node (e.g., switch, hub, etc.).

In addition, other embodiments may also be considered within the scope of the techniques described above, such as allowing for communication between access servers to ensure consistent/coherent configuration and to dynamically modify the respond/discard (accept/deny) decisions based upon system conditions (e.g., bandwidth allocation, failures, real-time traffic conditions, etc.).

Figure 7:
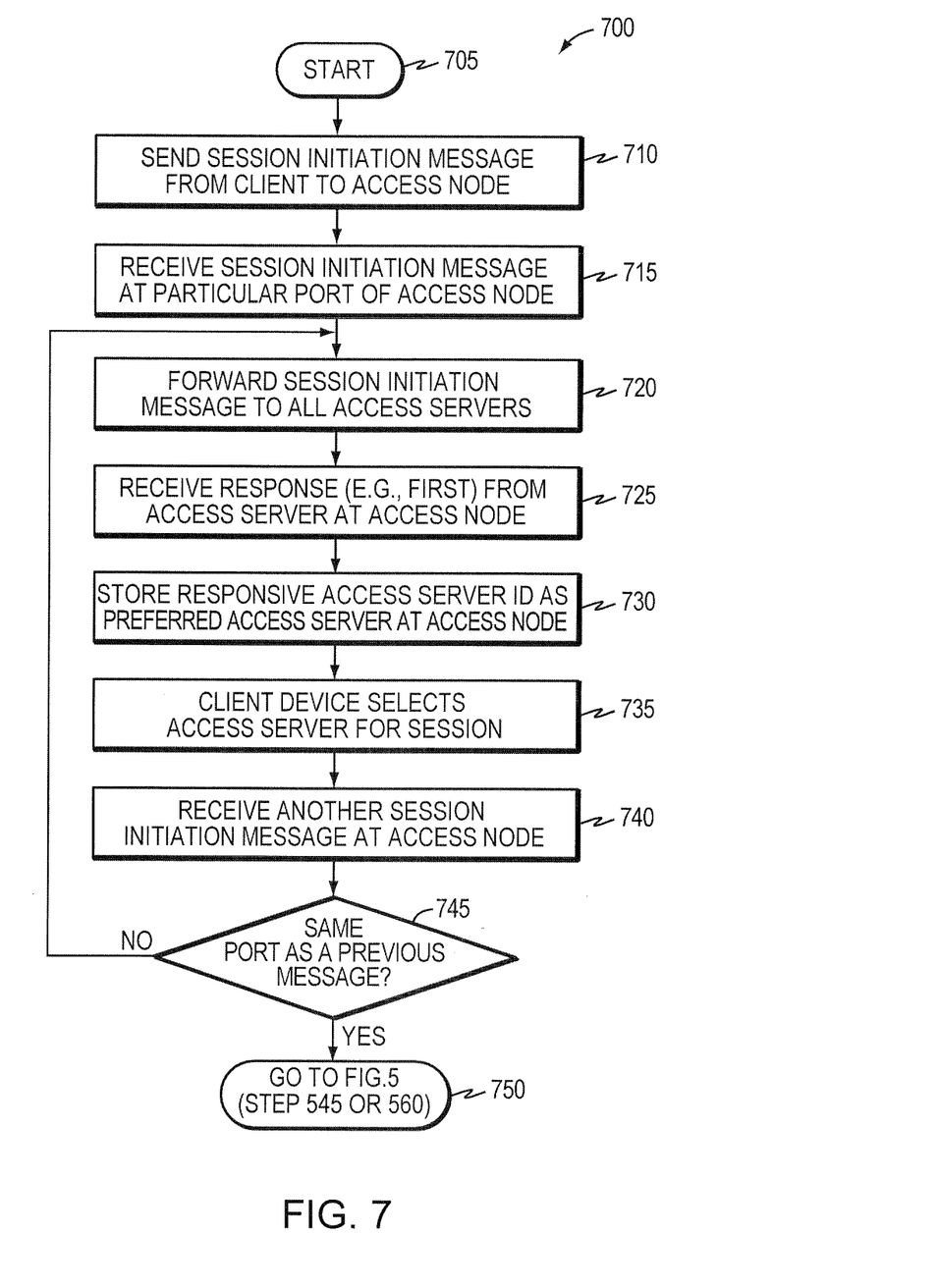
FIG. 7 illustrates an example procedure for an alternative embodiment of configuring a preferred access server port.

For instance, in one alternative embodiment, response messages from access servers sent through the access nodes may be used to dynamically determine a preferred access server port configuration. For example, with reference to FIG. 7, which illustrates a procedure 700 starting at step 705, a client may send a session initiation message (e.g., PPPoE PADI message) in step 710 to be received by an access node in step 715 at a particular port. The access node may then forward the message to all access servers in step 720, and may receive a response (e.g., the first response) from an access server in step 725 in a conventional manner. In step 730, the access node may store the ID of the responsive ("preferred") access server, which is selected by the client device in step 735 (as in step 575 of FIG. 5 above). Upon receiving another session initiation message at the access node in step 740, however, if the message is received on the same port as a previous message (step 745), then the procedure 700 continues in step 750 to FIG. 5, where in step 545 or 560, the preferred access server is managed by the access node, accordingly. In other words, based on the first responding access server to a session initiation message on a particular port of an access node, the access node can dynamically determine a preferred access server for future requests on that same port. In this manner, while not necessarily optimized for load-balancing, the access nodes can ensure that arbitrary sets of sessions of an access node (e.g., given ports, or the entire access node) are advantageously handled by the same access server.

The foregoing description has been directed to specific embodiments of this invention. It will be apparent; however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method, comprising:
    receiving, by an access node, a session initiation message from a client device on a first network interface located on a client device side of the access node, the session initiation message to initiate a session from the client device to one of a plurality of access servers located on an access device side of the access node;
    modifying, by the access node, the session initiation message to include a port identifier corresponding to the first network interface;
    forwarding, by the access node, the modified session initiation message that includes the port identifier to the plurality of access servers located on the access device side of the access node;
    receiving at least a first response to the modified session initiation message from a first access server from the plurality of access servers; and
    in response to a determination that the first response received from the first access server was received prior to responses to the modified session initiation message from other access servers from the plurality of access servers, storing, at the access node, an access server identifier for the first access server to identify the first access server as a preferred access server for the port identifier.

2. The method of claim 1, further comprising:
    informing each of the plurality of access servers of one or more network interfaces on the access node for which each of the plurality of access servers is a preferred access server.

3. The method of claim 2, further comprising:
    utilizing an access node control protocol (ANCP) to inform the access servers.

4. The method of claim 1, wherein the first access server is associated with a preferred access server identifier.

5. The method of claim 1, further comprising:
    receiving a second session initiation message from a second client device on the first network interface of the access node;
    modifying the second session initiation message to include a preferred access server identifier that corresponds to the first access server; and
    forwarding the modified second session initiation message to the plurality of access servers.

6. The method of claim 1, wherein a second response received from a second access server from the plurality of access servers is delayed because the second access server is not the preferred access server.

7. An access node comprising:
    one or more computer processors; and
    a memory storing instructions that, when executed by the one of more computer processors, cause the access node to:
    receive a session initiation message from a client device on a first network interface located on a client device side of the access node, the session initiation message to initiate a session from the client device to one of a plurality of access servers located on an access device side of the access node;
    modify the session initiation message to include a port identifier corresponding to the first network interface;
    forward the modified session initiation message that includes the port identifier to the plurality of access servers located on the access device side of the access node;
    receiving at least a first response to the modified session initiation message from a first access server from the plurality of access servers; and
    in response to a determination that the first response received from the first access server was received prior to responses to the modified session initiation message from other access servers from the plurality of access servers, store, at the access node, an access server identifier for the first access server to identify the first access server as a preferred access server for the port identifier.

8. The access node of claim 7, wherein the instructions further cause the access node to:
    inform each of the plurality of access servers of one or more network interfaces on the access node for which each of the plurality of access servers is a preferred access server.

9. The access node of claim 8, wherein the instructions further cause the access node to:
    utilize an access node control protocol (ANCP) to inform the access servers.

10. The access node of claim 7, wherein the first access server is associated with a preferred access server identifier.

11. The access node of claim 7, wherein the instructions further cause the access node to:
    receive a second session initiation message from a second client device on the first network interface of the access node;
    modify the second session initiation message to include a preferred access server identifier that corresponds to the first access server; and
    forward the modified second session initiation message to the plurality of access servers.

12. The access node of claim 7, wherein a second response received from a second access server from the plurality of access servers is delayed because the second access server is not the preferred access server.

13. A non-transitory computer-readable medium storing instructions that, when executed by an access node, cause the access node to:
    receive a session initiation message from a client device on a first network interface located on a client device side of the access node, the session initiation message to initiate a session from the client device to one of a plurality of access servers located on an access device side of the access node;
    modify the session initiation message to include a port identifier corresponding to the first network interface;

forward the modified session initiation message that includes the port identifier to the plurality of access servers located on the access device side of the access node;

receive at least a first response to the modified session initiation message from a first access server from the plurality of access servers; and in response to a determination that the first response received from the first access server was received prior to responses to the modified session initiation message from other access servers from the plurality of access servers, store, at the access node, an access server identifier for the first access server to identify the first access server as a preferred access server for the port identifier.

14. The non-transitory computer-readable medium of claim 13, wherein the instructions further cause the access node to:

inform each of the plurality of access servers of one or more network interfaces on the access node for which each of the plurality of access servers is a preferred access server.

15. The non-transitory computer-readable medium of claim 14, wherein the instructions further cause the access node to:

utilize an access node control protocol (ANCP) to inform the access servers.

16. The non-transitory computer-readable medium of claim 13, wherein the first access server is associated with a preferred access server identifier.

17. The non-transitory computer-readable medium of claim 13, wherein the instructions further cause the access node to:

receive a second session initiation message from a second client device on the first network interface of the access node;

modify the second session initiation message to include a preferred access server identifier that corresponds to the first access server; and forward the modified second session initiation message to the plurality of access servers.

18. The non-transitory computer-readable medium of claim 13, wherein a second response received from a second access server from the plurality of access servers is delayed because the second access server is not the preferred access server.

* * * * *